G. F. FOWLER.
ELASTIC BEARING FOR CENTRIFUGAL MACHINES.
APPLICATION FILED MAR. 4, 1911.
1,111,372.
Patented Sept. 22, 1914.
2 SHEETS—SHEET 1.
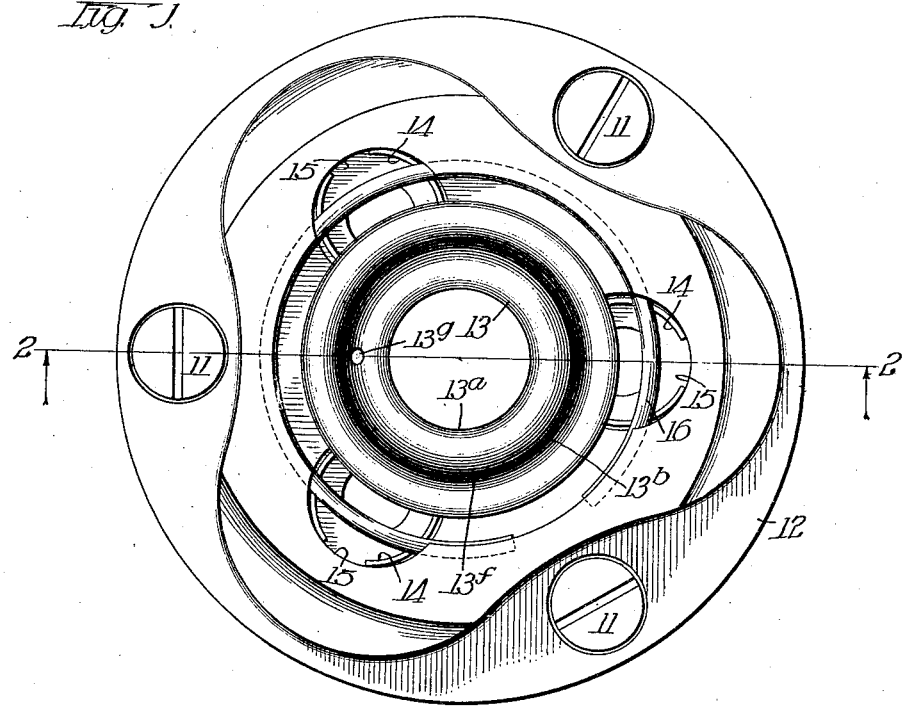
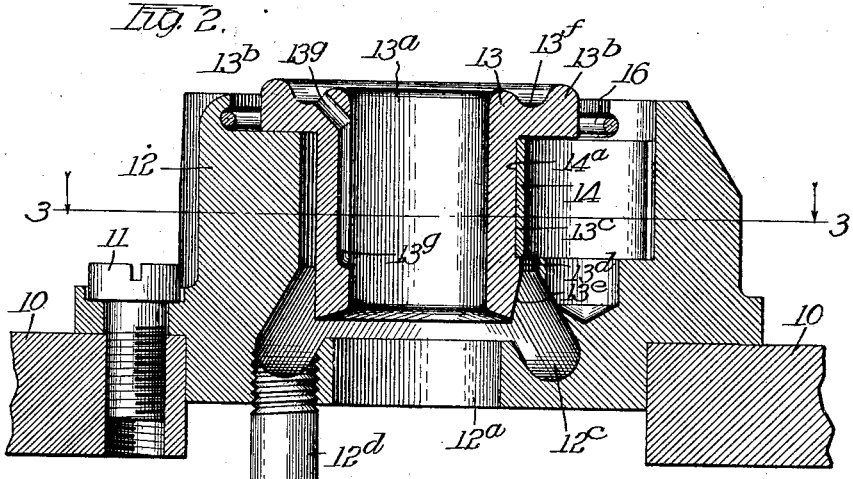

G. F. FOWLER.
ELASTIC BEARING FOR CENTRIFUGAL MACHINES.
APPLICATION FILED MAR. 4, 1911.
1,111,372.
Patented Sept. 22, 1914.
2 SHEETS—SHEET 2.
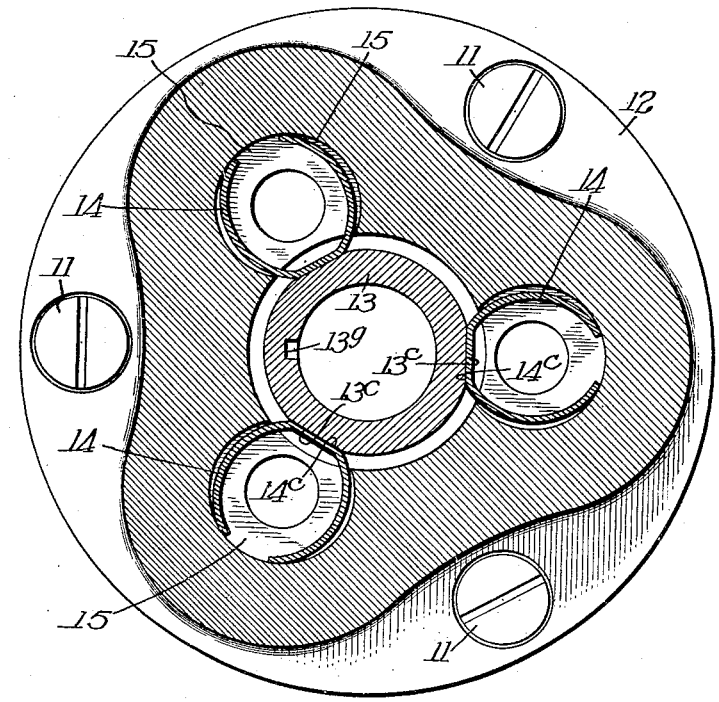
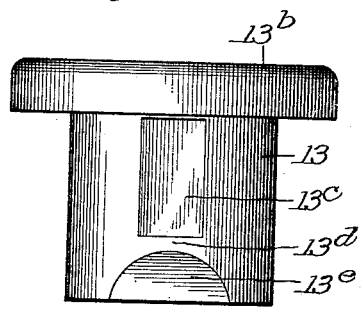
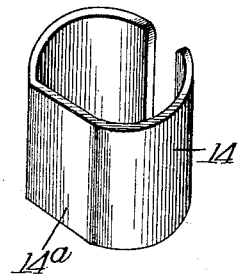

UNITED STATES PATENT OFFICE.

GORDON F. FOWLER, OF OAK PARK, ILLINOIS, ASSIGNOR TO SEARS, ROEBUCK & COMPANY, OF CHICAGO, ILLINOIS, A CORPORATION OF NEW YORK.

ELASTIC BEARING FOR CENTRIFUGAL MACHINES.

1,111,372. Specification of Letters Patent. Patented Sept. 22, 1914.

Application filed March 4, 1911. Serial No. 612,172.

*To all whom it may concern:*

Be it known that I, GORDON F. FOWLER, a citizen of the United States, residing at Oak Park, in the county of Cook and State of Illinois, have invented certain new and useful Improvements in Elastic Bearings for Centrifugal Machines, of which the following is a full, clear, and exact specification.

The invention relates to bearings for supporting bowl spindles of centrifugal machines, and more particularly to means for rendering such bearings elastic to provide against injurious shocks and jars to bowls and spindles of centrifugal machines, which in order to be effective rotate at relatively high rates of speed.

The primary object of the invention is to secure an elastic bearing for supporting bowl carrying spindles of centrifugal machines which shall be simple and cheap in construction and efficient in operation, practically rendering the movable bearing self-centering and yet permitting it to move out of centered position under the action of metallic springs, which although resilient do not tend to return the bearing with such force as to cause the bearing on reaching the center to rebound to the other side or to vibrate, which is a serious objection in an elastic bearing of this general character.

To the attainment of these ends and the accomplishment of certain other new and useful objects which will subsequently appear, the invention consists in the features of novelty hereinafter described, shown in the accompanying drawings forming a part of this specification, and pointed out with greater particularity in the appended claims.

In the said drawings,—Figure 1 is a plan view of my improved bearing. Fig. 2 is a vertical section taken through the center of the bearing on the line 2, 2 of Fig. 1, looking in the direction indicated by the arrows. Fig. 3 is a horizontal sectional view taken through the bearing as indicated on line 3, 3 of Fig. 2, looking downward. Figs. 4 and 5 are detail views, Fig. 4 being a view in elevation of the movable bearing block or bushing, while Fig. 5 is an enlarged perspective view of one of the cylindrical springs.

In Fig. 2 is shown broken portions of the frame of a centrifugal machine as indicated by the reference character 10, my improved bearing being secured thereto by suitable machine screws as indicated by the reference character 11, which pass through perforations in the peripheral flange of the housing or bearing support 12 and secured to the frame of the machine in fixed relation thereto. This fixed support 12 is provided with a central perforation as indicated at $12^a$, through which extends loosely the bowl spindle of the machine, the opening $12^a$ being large enough to permit the bowl spindle to have considerable movement without binding against the sides of the fixed member 12. The bearing block or bushing proper which immediately surrounds the bowl spindle, is indicated by the reference character 13, the same being provided with a vertical opening $13^a$ adapted to closely surround and form a journal bearing for the bowl spindle. At the upper extremity of the bearing block 13 is a peripheral flange as indicated at $13^b$, adapted to ride upon a bearing surface formed adjacent the upper extremity of the fixed support 12. Above the enlarged spindle opening $12^a$ in the member 12, is an enlargement into which the lower cylindrical portion of the bearing block 13 is adapted to extend, the same being formed of sufficient size to allow the bearing block 13 to have any desired amount of lateral movement therein. This bearing block is centered and elastically controlled by any suitable number of cylindrical springs, as indicated by the reference character 14, there being preferably three of such springs normally supported in suitable housings 15 formed around the periphery of the enlarged opening in the stationary supporting member 12, these housings opening into the common enlargement for the bearing block 13 in such a manner that the cylindrical or coiled springs 14 may extend beyond the periphery of said opening into contact with the flattened portions $13^c$ on the periphery of the bearing block 13. These flattened portions $13^c$ in the periphery of the bearing block do not extend entirely to the bottom of the cylindrical portions thereof, but are terminated some distance above its lower extremity, as shown most clearly in Figs. 2 and 4. The springs 14 although perfectly cylindrical in general form, are left open at the ends of the strip forming the same, as shown in Figs. 1, 3 and 5, and are formed midway between the extremity of the strip of metal with a flattened portion, as indicated at $14^a$, which flattened portion is adapted to bear against the seat $13^c$ in the periphery of the cylindrical portion of the bearing block 13.

Surrounding the upper extremity of the opening in the fixed support 12 is a groove adapted to take the expansion spring 16, which is preferably formed of a piece of suitable metallic wire bent in circular form, with its ends free to be moved toward and from each other for varying the size of the ring. This circular member 16 is adapted to be placed in the groove in the member 12 just above the top of the openings or housings 15 containing the cylindrical springs 14, and passing over the top of said springs serves to retain the springs within their housings in the stationary member 12. The enlarged peripheral portion or flange $13^b$ on the bearing block 13 limits the downward movement of the same in relation to the stationary member 12, but the opening within the member 12 being larger than the extreme diameter of the cylindrical portion of the bearing block 13, this bearing block has a limited amount of movement under the control of the springs 14, which normally tend to center it. The flattened portions $13^c$ on the bearing block terminating short of the bottom thereof, form a shoulder as indicated at $13^d$, which bearing against the bottom of the coiled or cylindrical springs 14, tend to hold the bearing normally in position, and the flattened portions $13^c$ bearing against the coiled flattened portions $14^a$ on the spring, prevent the bearing block 13 from rotating in relation to the machine frame under the influence of the spindle.

When it is desired to remove the bearing block 13, the elastically retaining ring 16 is first compressed and removed from beneath the peripheral flange surrounding the top of the opening in the stationary member 12, after which the bearing block 13 may be moved upwardly carrying the cylindrical springs 14 with it. In assembling, the springs 14 are first placed in their housings with the flat portions $14^a$ in proper relation to the central opening for the bearing block, after which the bearing block 13 may be pressed downwardly into position, the lower extremity of the block preferably being slightly beveled, as indicated at $13^e$, to have a wedging action upon the flattened portions of the springs 14. When the bearing block and the springs are in their normal position the elastic ring 16 being first compressed, is inserted and allowed to expand, thus securing the parts in their normal working positions.

For the purpose of supplying lubricant to the frictional surfaces on the bearing block 13 and the spindle supported thereby, the block is provided with the upper peripheral oil groove $13^f$, from which a suitable duct as indicated at $13^g$ leads to the bearing surfaces.

For the purpose of utilizing the drip from the bearing and supplying it to the usual gearing below in the frame of the cream separator, around the central opening in the supporting member 12 the peripheral groove $12^c$ is formed, from which a suitable duct $12^d$ conveys the lubricant to the parts below in the main frame of the machine. This latter described lubricating means is one of the important features of the invention, preventing the waste of lubricant.

It is found that the construction is exceedingly efficient, because the bearing block supporting the bowl spindle is normally kept properly centered and because of the fact that the extremities of the springs 14 normally tending to expand are constantly engaging with considerable force against the walls of the housings 15, there is sufficient friction between the springs and the bearing supporting member to prevent the springs from returning the bearing to center with sufficient force to cause a rebound and consequent chattering or vibration of the bearing, which has heretofore been one of the difficulties sought to be overcome in elastic bearings, particularly where metallic springs have been used. It is also found that by my improved bearing as described there is no danger of accident because of the breaking of the springs, the bearing block 13 being permitted only a limited amount of lateral movement under spring control, and when a spring breaks the interior wall of the member 12 will prevent the displacement of the bearing and the bowl spindle beyond a point where danger would result should the bowl be permitted while under speed to contact with the bowl casing or other parts of the main frame of the machine. The above construction is also easily assembled, and parts required for repairs are light and easily replaced at small cost. It will also be seen that the bearing support is constructed in such a manner that should the cylindrical springs 14 or the elastic ring 16 become broken such broken parts will not fall down below the support 12 into the gearing and driving mechanism in the lower part of the main frame, which has often heretofore been the cause of the destruction of this mechanism.

In order that the invention might be fully understood the details of the preferred embodiment thereof have been thus specifically described, but it is not desired to be limited to the exact details of construction herein shown, for it will be apparent that many modifications may be suggested by those skilled in the art without departing from the purpose and spirit of the invention.

I claim:

1. In an elastic journal bearing, the combination with a stationary support being provided with an enlarged journal opening, of a bearing block movably mounted in said enlarged journal opening, there being formed in said support a plurality of cylindrical chambers having their axes approximately parallel with the axis of the said enlarged opening and lying beyond the periphery of said opening but having communication therewith, and elastic means comprising coil springs formed from flat pieces of spring metal rolled into cylindrical form and supported in said chambers with the open ends of said springs in close contact with the walls of said chambers and having their peripheral portions approximately midway between their open ends extending into the said enlarged journal opening into contact with said bearing block.

2. In an elastic journal bearing, the combination with a stationary support being provided with an enlarged journal opening, of a bearing block having a journal opening therein and an exterior surface of approximately cylindrical form, there being a plurality of flat surfaces formed on the exterior of the said bearing block, and a plurality of coil springs formed from flat pieces of spring metal rolled into cylindrical form and supported in cylindrical chambers formed in said stationary support beyond the periphery of said journal opening but having communication with said opening whereby portions of said coil springs extend into said journal opening in contact with the aforesaid flattened portions on the bearing block, said coil springs being formed open and having their free ends under elastic tension of the spring metal in said coils in close contact with the walls of said cylindrical chambers in the stationary support.

3. In an elastic journal bearing, the combination with a stationary support being provided with an enlarged journal opening, of a bearing block movably mounted in the said enlarged journal opening, there being formed in said support a plurality of chambers normally lying beyond the periphery of said journal opening but having communication therewith, elastic means comprising coils of spring metal supported in said chambers and having portions of their peripheries extending into said enlarged journal opening in contact with said bearing block, and means for retaining said elastic means in said chambers comprising an open ended metallic coil secured in a peripheral groove around the said enlarged journal opening near the top of the stationary support.

In testimony whereof I have signed my name to this specification, in the presence of two subscribing witnesses, on this 1st day of March, A. D. 1911.

GORDON F. FOWLER.

Witnesses:
A. L. SPRINKLE,
C. H SEEM.

---

Copies of this patent may be obtained for five cents each, by addressing the "Commissioner of Patents, Washington, D. C."